US011594074B2

(12) United States Patent
Singh

(10) Patent No.: US 11,594,074 B2
(45) Date of Patent: Feb. 28, 2023

(54) CONTINUOUSLY EVOLVING AND INTERACTIVE DISGUISED FACE IDENTIFICATION (DFI) WITH FACIAL KEY POINTS USING SCATTERNET HYBRID DEEP LEARNING (SHDL) NETWORK

(71) Applicant: Amarjot Singh, Burlingame, CA (US)

(72) Inventor: Amarjot Singh, Burlingame, CA (US)

( * ) Notice: Subject to any disclaimer, the term of this patent is extended or adjusted under 35 U.S.C. 154(b) by 406 days.

(21) Appl. No.: 17/011,177

(22) Filed: Sep. 3, 2020

(65) Prior Publication Data
US 2021/0073521 A1    Mar. 11, 2021

Related U.S. Application Data

(60) Provisional application No. 62/898,528, filed on Sep. 10, 2019.

(51) Int. Cl.
| | | |
|---|---|---|
| *G06V 40/00* | (2022.01) | |
| *G06V 40/16* | (2022.01) | |
| *G06K 9/62* | (2022.01) | |
| *G06N 3/08* | (2023.01) | |
| *G06V 10/60* | (2022.01) | |

(52) U.S. Cl.
CPC ......... *G06V 40/173* (2022.01); *G06K 9/6256* (2013.01); *G06N 3/08* (2013.01); *G06V 10/60* (2022.01); *G06V 40/166* (2022.01)

(58) Field of Classification Search
CPC .... G06V 40/173; G06V 10/60; G06V 40/166; G06K 9/6256; G06N 3/08
See application file for complete search history.

(56) References Cited

U.S. PATENT DOCUMENTS

| | | | |
|---|---|---|---|
| 7,430,315 B2 | 9/2008 | Yang et al. | |
| 8,913,798 B2 | 12/2014 | Kim et al. | |
| 9,852,492 B2 | 12/2017 | Saberian et al. | |
| 10,268,950 B2 | 4/2019 | Yin et al. | |
| 11,163,982 B2 * | 11/2021 | Han | G06K 9/6288 |
| 2013/0163829 A1 * | 6/2013 | Kim | G06K 9/00 382/118 |
| 2017/0032179 A1 * | 2/2017 | Al-Qunaieer | G06V 40/168 |
| 2017/0140211 A1 * | 5/2017 | Hayasaka | G06V 20/647 |

OTHER PUBLICATIONS

Dhamecha, Tejas Indulal, et al. "Recognizing disguised faces: Human and machine evaluation." PloS one 9.7 (2014): e99212. (Year: 2014).*

(Continued)

*Primary Examiner* — Fayyaz Alam

(57) ABSTRACT

Disguised Face Identification (DFI) system and method for identifying multiple individuals with disguised faces in uncontrolled environments/scenarios is provided. The Disguised Face Identification (DFI) system and method includes detecting facial landmarks/facial key-points and performing face identification using the ScatterNet Hybrid Deep Learning (SHDL) Network. The system also can be evolved, after deployment, by the user as it provides one with an ability to add new faces to a known face database which are identified by the system thereafter. Further includes two facial disguise (FG) datasets, the datasets are simple facial disguise (FG) datasets and complex facial disguise (FG) datasets for training the deep convolutional networks.

20 Claims, 5 Drawing Sheets

(56) References Cited

OTHER PUBLICATIONS

Bodhe, Saurabh, Prathamesh Kapse, and Amarjot Singh. "Real-time age-invariant face recognition in videos using the scatternet inception hybrid network (SIHN)." Proceedings of the IEEE/CVF International Conference on Computer Vision Workshops. 2019. (Year: 2019).*

Singh, Amarjot, Devendra Patil, and S. N. Omkar. "Eye in the sky: Real-time drone surveillance system (dss) for violent individuals identification using scatternet hybrid deep learning network." Proceedings of the IEEE conference on computer vision and pattern recognition workshops. 2018. (Year: 2018).*

Singh, Amarjot, and Nick Kingsbury. "Scatternet hybrid deep learning (shdl) network for object classification." 2017 IEEE 27th International Workshop on Machine Learning for Signal Processing (MLSP). IEEE, 2017. (Year: 2017).*

Naman Kohli, Daksha Yadav, Afzel Noore; Title: Face Verification with Disguise Variations via Deep Disguise Recognizer; 2018 IEEE/CVF Conference on Computer Vision and Pattern Recognition Workshops (CVPRW).

Skand Vishwanath Peri, Abhinav Dhall; Title: DisguiseNet: A Contrastive Approach for Disguised Face Verification in the Wild; 2018 IEEE/CVF Conference on Computer Vision and Pattern Recognition Workshops (CVPRW), Apr. 25, 2018.

Kaipeng Zhang, Ya-Liang Chang, Winston Hsu; Title: Deep Disguised Faces Recognition; 2018 IEEE/CVF Conference on Computer Vision and Pattern Recognition Workshops (CVPRW); Dec. 17, 2018.

Ankan Bansal, Rajeev Ranjan, Carlos D. Castillo, Rama Chellappa; Title Deep Features for Recognizing Disguised Faces in the Wild; Proceedings of the IEEE Conference on Computer Vision and Pattern Recognition (CVPR) Workshops, 2018, pp. 10-16.

* cited by examiner

CONTINUOUSLY EVOLVING AND INTERACTIVE DISGUISED FACE IDENTIFICATION (DFI) WITH FACIAL KEY POINTS USING SCATTERNET HYBRID DEEP LEARNING (SHDL) NETWORK

CROSS REFERENCE TO RELATED APPLICATIONS

This application claims priority on U.S. Provisional Patent Application No. 62/898,528, entitled "Continuously Evolving and Interactive Disguised Face Identification (DFI) with Facial Key Points using ScatterNet Hybrid Deep Learning (SHDL) Network", filed on Sep. 10, 2019, which is incorporated by reference herein in its entirety and for all purposes.

FIELD OF THE INVENTION

The present invention relates to a Disguised Face identification (DFI) system and method for identifying individuals with disguised faces in uncontrolled environments/uncontrolled scenarios. More particularly, the invention relates to a ScatterNet Hybrid Deep Learning (SHDL) Network for identifying individuals with disguised faces. The ScatterNet Hybrid Deep Learning (SHDL) Network detects facial landmarks or key points from the disguised face; then these facial landmarks or key points are utilized to form a unique face-specific signature; and this unique signature is used to identify individuals with the disguised faces by comparing it into the known database of non-disguised faces. The DFI system can be evolved by the user after deployment to immediately identify new faces, added to the database by simply clicking the face on a monitor screen (interactive). The SHDL network is able to identify these newly added faces from only their single added image using one-shot learning.

BACKGROUND OF THE INVENTION

Generally, the facial identification technologies are being used for various security purposes such as for preventing crimes, tracking down the criminals, identifying suspected individuals, detecting suspicious activities and determining many other unlawful and suspicious activities. Further, these technologies are also being used in several other applications including tracking school attendance, facilitate secure financial transactions, recognize VIPs at sporting events, identify people on social media platforms, etc.

Hence, it is necessary that these facial identification technologies can recognize faces at different orientations and distances. Further, These systems can also identify individuals who disguise their identity by including a wide variety of altered physical attributes on the face or wearing numerous disguises such as wearing a wig, changing hairstyle or hair color, wearing eyeglasses, removing or growing beards, wearing scarves, wearing caps, wearing mask etc.

There are several such face identification and analysis systems and methods are known in the prior art. For example, U.S. patent application Ser. No. 14/406,927 discloses face detection system that is based on a structure of a convolutional neural network (CNN) and a method for automatically training a convolutional neural network (CNN) for face detection.

U.S. Pat. No. 8,913,798B2 discloses a system and a method for recognizing a disguised face using Gabor features. The system for recognizing a disguised face includes a graph generation means to generate a single standard face graph from a plurality of facial image samples, a support vector machine (SVM) learning means to determine an optimal classification plane for discriminating a disguised face from the plurality of facial image samples and disguised facial image samples. It is important to note that this technique just determines if a face is disguised but is unable to reveal the identity of the individual. The identity of individuals in disguises is necessary to find the individuals attempting to conceal their identity.

Chinese Patent Application No. CN108830262A discloses a Multi-angle facial expression recognition method based on MVFE-Light Net network in a natural state.

Chinese Patent Application No. CN107491726A discloses a real-time expression recognition method based on a multichannel parallel convolutional neural network (MPCNN) for different poses. The method comprises synthesizing a front face image corresponding to a human face image of any pose, and detecting key feature points based on the synthesized front face image, and extracting key regions by taking the feature points as centres, performing quick unsupervised feature learning based on the key regions and performing convolution sum pooling by taking each key region as a unit to obtain unsupervised high-level features for identifying the human face expression at any pose.

Kohli et al. proposed a Deep Disguise Recognizer (DDR) framework based transfer learning approach for face identification with disguise variations. Their system used the Residual Inception network and Inception-ResNet network followed by inductive transfer learning to mitigate the impact of facial disguises.

Peri et al. proposed VGG-face architecture paired with Contrastive loss based on cosine distance metric to verify the identity of a person among disguised and impostors images.

Zhang et al. proposed a two-stage training approach to perform disguised face identification. In the first stage, they trained a Deep Convolutional Neural Networks (DCNNs) for generic face recognition. In the second stage, they used Principal Components Analysis (PCA) based on the Disguised Faces in the Wild (DFW) training set to find the best transformation matrix that preserves the identity of disguised faces.

Bansal et al. presented a Deep Convolutional Neural Networks (DCNNs) based approach for recognizing people with disguises and picking out impostors. They trained two different networks on a large dataset consisting of still images and video frames with L2-softmax loss. Next, they fused features obtained from the two networks and showed that the resulting features are effective for discriminating between disguised faces and impostors in the uncontrolled scenarios.

The prior art on identifying a disguised face with altered physical attributes primarily depends on extracting features from the complete face or from facial landmarks which are then used to construct a complex feature finally utilized to identify the disguised face by matching to a known face database. Most of the individual's face or the facial landmarks may be hidden due to disguises like wearing a wig, changing hairstyle or hair color, wearing eyeglasses, removing or growing beards, wearing scarves or caps. Therefore, extracting features from the complete face may not be the best solution as features from the disguises are also included in the extracted features. Similarly, feature corruption will be present if the features are extracted from around the landmarks as several landmarks may be hidden by the disguises. These factors may degrade the performance of the system. To identify the individual with the disguised face, there is an ardent need to analyze the shape of the face using facial key points as they can be used to construct a unique face-specific descriptor which is not affected by the disguises. In addition, one might intend to add the face image of an individual to the database of faces who committed an unlawful activity and are required to be recognised immediately thereafter. This becomes critical if one intends to find the individual in the crowd using the facial recognition system. It would be ideal to have a system that can learn to recognize newly added faces to the current face database as needed. This can have major implications for security applications where an individual who has committed a crime needs to be identified and tracked through a mall or other crowded places as soon as it commits the crime.

The current disguise identification systems work only in indoor environments with well-controlled face orientation, distance from the camera, and lighting conditions. However, most face recognition applications such as criminal identification, tracking school attendance, facilitate secure financial transactions, recognize VIPs at sporting events, and require the face recognition technology to work in uncontrolled environments.

In addition, the current deep learning-based solutions learn the statistics of the faces from a dataset during training. Once the model is deployed, it can recognize the individuals in the query image by matching it to the learned face statistics. The deployed model can't be changed or adapted to learn additional new faces after deployment. This is a major drawback as the addition of new faces requires the complete retraining of the model on the complete dataset which requires extensive effort.

Therefore, the present invention discloses a facial keypoint detection framework for disguised face identification for uncontrolled environments/uncontrolled scenarios. This system can also be evolved by the user after it has been deployed by allowing the user to add faces to the database when needed, by simply clicking on the face on the monitor screen (interactive), and which can be identified immediately thereafter by the system.

SUMMARY OF THE INVENTION

The present invention provides a Disguised Face Identification (DFI) system and method for detecting the facial landmarks or facial keypoints and performing face identification using the detected facial keypoints.

In one aspect, the present invention provides a Disguised Face Identification (DFI) system for identifying individuals with disguised faces; the system includes a Disguised Face Identification (DFI) Framework that receives at least one input image (one or more image of a disguised face), a ScatterNet Hybrid Deep Learning (SHDL) Network performs estimation of facial keypoints from the image of the disguised face using the deep convolutional networks. Further the ScatterNet Hybrid Deep Learning (SHDL) Network detects facial keypoints from the disguised face, then these facial key points are arranged into star structure to form a unique face-specific signature, and the unique face-specific signature is compared into a known non-disguised faces database that identities the individuals with the disguised faces.

In one more aspect of the present invention, the system can also be evolved by the user after it has been deployed by allowing the user to add faces to the database, by simply clicking the face on a monitor screen (interactive), when needed. The facial landmarks of the newly added faces are detected by the ScatterNet Hybrid Deep Learning (SHDL) after which they can be immediately identified thereafter by the system in one-shot with just a single image.

In an aspect of the present invention, the system includes a Disguised Face Identification (DFI) framework for evaluation on two facial disguise (FG) datasets. The facial disguise (FG) datasets include simple facial disguise (FG) datasets and complex facial disguise (FG) datasets for training the deep convolutional networks.

In another aspect of the present invention, the Disguised Face Identification (DFI) framework first uses the ScatterNet Hybrid Deep Learning Network to detect several facial key-points on the faces detected from the input image. The detected facial keypoints which are then connected to construct a unique face-specific signature (star structure). The orientations between the connected points in the star-net structure are then used to match the input face to the database of known non-disguised faces. This system also allows the user to add new face images to the face database, by simply clicking on the face on the monitor screen 102 (interactive), which the software can detect there onwards. The newly added faces to the database whose facial landmarks are detected by the ScatterNet Hybrid Deep Learning (SHDL) using a single image and then these faces can be recognized identified immediately thereafter if needed. This ability of the system to evolve after being deployed is extremely important and useful for applications where an individual needs to be identified in public areas, immediately after committing an unlawful activity, using face recognition.

One advantage of the present invention is an interactive Disguised Face Identification (DFI) with Facial Key Points using the ScatterNet Hybrid Deep Learning (SHDL) Network.

One advantage of the present invention is the system identifies individuals with the disguised faces including a wide variety of altered physical attributes on the face or wearing numerous disguises such as but not limited to wearing a wig, changing hairstyle or hair color, wearing eyeglasses, removing or growing beards, wearing scarves, wearing caps, wearing mask etc.

Another advantage of the present invention is the system identifies or recognizes the disguised faces of the individual at different orientations and distances.

Another advantage of the present invention is the system identifies or recognizes the individuals with the disguised faces in uncontrolled environments/scenarios.

Another advantage of the present invention is the system identifies or recognizes multiple individuals with different disguises in uncontrolled scenarios. This is possible as the system is trained on a large dataset that contains faces with varied disguises, covering different backgrounds and under varied illuminations. This allows the system to perform robust face recognition in the presence of different disguises and background variations.

Another advantage of the present invention is the deployed system can also be evolved by the user as he/she can add new faces to the database, by simply clicking the face on the monitor screen (interactive). The ScatterNet Hybrid Deep Learning (SHDL) Network detects the facial landmarks for these newly added faces without the need for extensive complete dataset training and can recognize these newly added faces in uncontrolled environments when seen thereafter.

The foregoing summary is illustrative only and is not intended to be in any way limiting. In addition to the illustrative aspects, embodiments, features and advantages described above, further aspects, embodiments, features and advantages will become apparent by reference to the drawings and the following detailed description.

BRIEF DESCRIPTION OF THE DRAWINGS

The object of the invention may be understood in more detail and more particularly the description of the invention briefly summarized above by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DETAILED DESCRIPTION OF THE INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

In various embodiments, the present invention provides a Disguised Face Identification (DFI) system and method for detecting the facial keypoints and performing face identification using the detected facial key-points.

Figure 1:
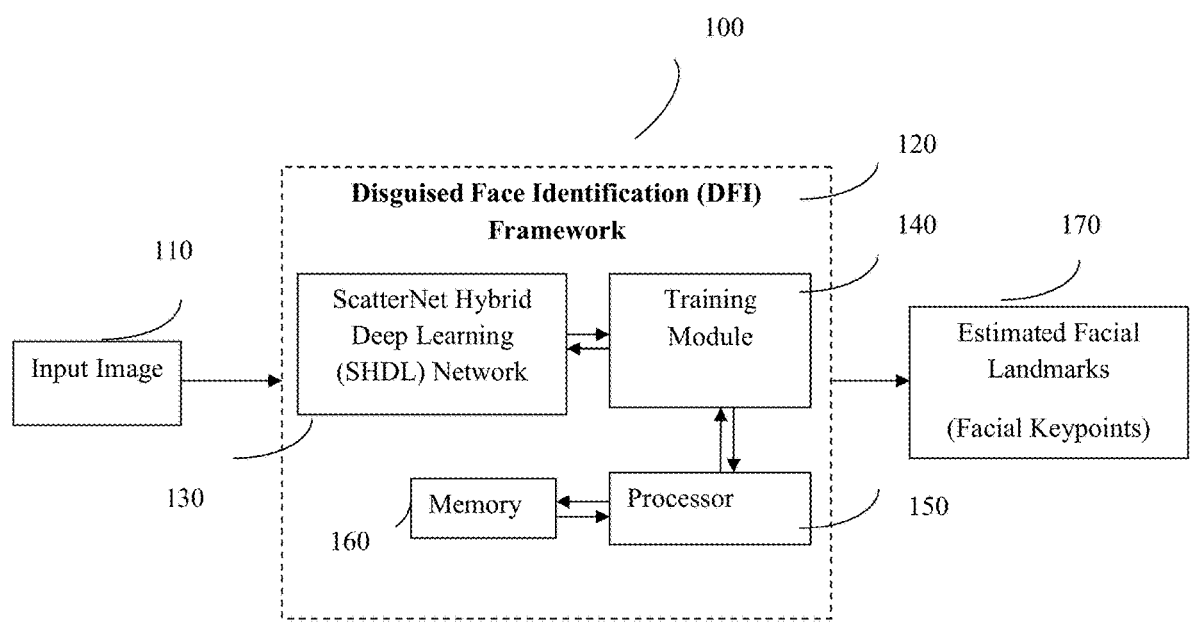
FIG. 1 illustrates an exemplary block diagram of a Disguised Face Identification (DFI) system in accordance with the present invention.

FIG. 1 shows an exemplary block diagram of the Disguised Face Identification (DFI) system 100 according to one embodiment of the present invention. The Disguised Face Identification (DFI) system 100 receives an input image 110 and determines an individual with estimated facial landmarks or facial keypoints 170.

Disguised Face Identification (DFI) system 100 includes a Disguised Face Identification (DFI) Framework 120 configured with ScatterNet Hybrid Deep Learning (SHDL) Network 130, a training module 140, a processor 150 and a memory 160. The Disguised Face Identification (DFI) system 100 performs estimation of facial landmarks or facial keypoints using the ScatterNet Hybrid Deep Learning (SHDL) Network 130. The training module 140 trains the ScatterNet Hybrid Deep Learning (SHDL) Network 130. The processor 150 executes instructions to perform estimation of facial landmarks or facial keypoints on the ScatterNet Hybrid Deep Learning (SHDL) Network 130. The processor 150 receives instructions from memory 160, or external circuitry. Each of these components may be embodied as hardware, software, firmware, or a combination thereof. Together, these components perform face detection for an individual of the input image 110. The Disguised Face Identification (DFI) system 100 includes the disguised face identification (DFI) framework 120 for evaluation of the facial landmarks or facial keypoints on facial disguise (FG) datasets.

The training module 140 trains the ScatterNet Hybrid Deep Learning (SHDL) Network 130 in the Disguised Face Identification (DFI) framework 120 for performing facial landmarks or key points identification.

In one embodiment, the training module 130 trains the ScatterNet Hybrid Deep Learning (SHDL) Network 130 using facial disguise (FG) datasets. The Disguised Face Identification (DFI) system 100 may have a large database for storing facial disguise (FG) datasets.

Figure 2:
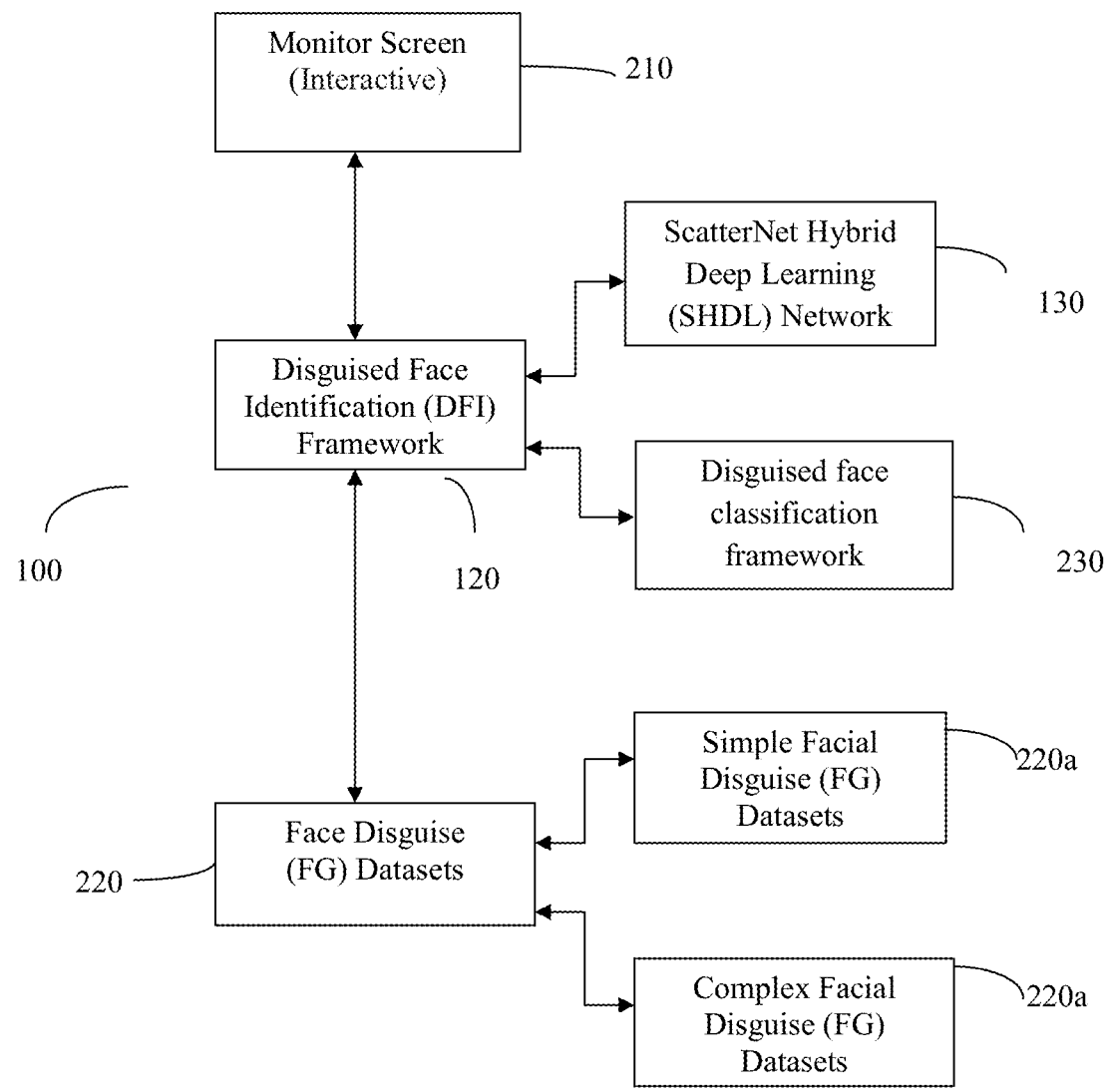
FIG. 2 illustrates an exemplary block diagram of an Interactive Disguised Face Identification (DFI) system in accordance with the present invention.

As shown in FIG. 2, in another embodiment the Disguised face identification (DFI) 100 can also be evolved by the user after it has been deployed by allowing the user to add faces to the database, by simply clicking the face on the monitor screen (interactive) 210, when needed and which can be identified immediately thereafter by the system 100.

As shown in the FIG. 2, The system 100 includes a Disguised Face Identification (DFI) framework 120 for evaluation on two facial disguise (FG) datasets 220.

In one embodiment of the present invention, the facial disguise (FG) datasets 220 include simple facial disguise (FG) datasets 220a and complex facial disguise (FG) datasets 220b for training the deep convolutional networks.

Figure 3:
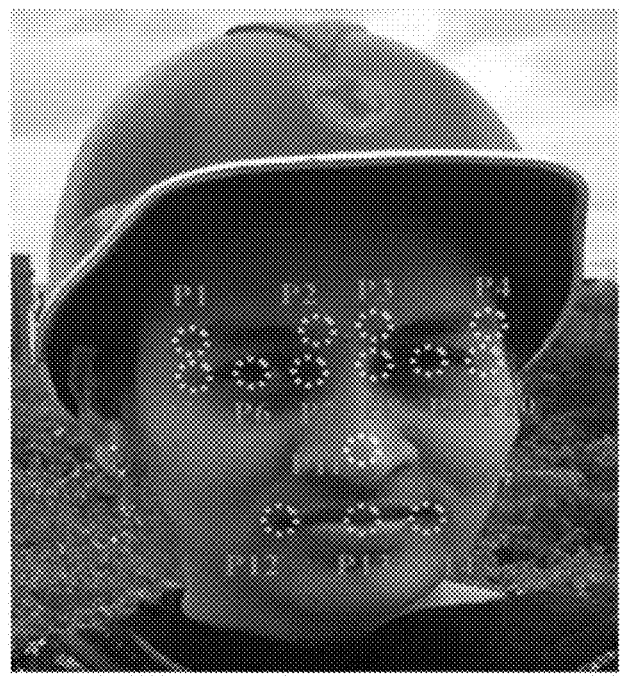
FIG. 3 illustrates the several facial keypoints in accordance with the present invention.

In one preferred embodiment the present invention discloses the Disguised Face Identification (DFI) framework 120 for detecting facial key-points for disguised face identification. The Disguised Face Identification (DFI) framework 120 first uses the ScatterNet Hybrid Deep Learning Network 130 to detect several facial landmarks facial key-points, as shown in FIG. 3. The detected facial keypoints are then connected to form a unique face-specific star-net structure. The orientations between the connected points in the star-net structure are then used by the Disguised Face Classification framework 120 to perform the match the input face image 110 with the database of known non-disguised faces.

The invention provides two facial disguise (FG) datasets 220 to improve the training of deep convolutional networks due to their reliance on large training datasets.

In one embodiment of the present invention, the Disguised Face Identification (DFI) Framework 120 uses the ScatterNet Hybrid Deep Learning Network 130 to extract several key-points from the face that are considered essential to describe the facial structure.

In one embodiment, the several facial key points belong to the eyes region, nose region and lips region. The facial key points for the eyes region consist of the points P1, P2, P3, P4, P5, P6, P7, P8, P9, and P10, the nose region facial key points consist of keypoint P11 and the Lips region facial keypoints consists of P12, P13, and P14 keypoints as shown in FIG. 3.

The training of the deep convolutional network used for facial key-point detection requires a large amount of data. However, such datasets are not available due to which researchers have relied upon pre-trained deep networks obtained using standard non-disguised datasets to detect facial keypoints. The deep networks trained on non-disguise datasets may not be suitable for this application as they may not transfer well to the disguised face application.

In order to avoid the above-mentioned issues, in another embodiment of the present invention proposes two facial disguise (FG) datasets 220, i.e., simple facial disguise (FG) datasets 220a and complex facial disguise (FG) dataset 220b that can be used in the future to train deep convolutional networks for facial keypoints detection. The Disguised Face Identification (DFI) framework 120 is trained and tested for facial disguise identification on both simple facial disguise (FG) dataset 220a and complex facial disguise (FG) dataset 220b.

As mentioned above, the deep convolutional networks requires a large number of images with various combinations of disguises like people with eyeglasses, beard, different hairstyles, different hair colors, wig and scarf or cap to perform accurately. Therefore, in the present invention, the Disguised Face Identification (DFI) system 100 includes Face Disguise (FG) Datasets 220 of nearly 2000 images or more with (i) Simple facial disguise (FG) dataset 220a and (ii) Complex facial disguise (FG) dataset 220b that contain people with varied disguises, covering different backgrounds and under varied illuminations. In one embodiment, each proposed dataset (Simple and Complex) is formed of at least 2000 images or more recorded with male and female subjects aged from 18 years to 30 years. In an alternate embodiment, each proposed dataset (Simple and Complex) can formed of at least 2000 images or more recorded with either male or either female or both with any age groups without limiting the scope of the invention.

Figure 4:
FIG. 4 illustrates various images of facial disguise (FG) datasets in accordance with the present invention.

As shown in FIG. 4, in an exemplary embodiment the facial disguise (FG) datasets 220 was collected in 8 different backgrounds, 25 subjects and 10 different disguises. The disguises in the dataset are namely: (i) sun-glasses (ii) cap/hat (iii) scarf (iv) beard (v) glasses and cap (vi) glasses and scarf (vii) glasses and beard (viii) cap and scarf (ix) cap and beard (x) cap, glasses, and scarf. The images from each dataset are shown in FIG. 4 is only for exemplary purpose without limiting the scope of the present invention.

In another embodiment, Disguised Face Identification (DFI) system 100 first detects several facial keypoints using the ScatterNet Hybrid Deep Learning (SHDL) Network 130. The ScatterNet Hybrid Deep Learning (SHDL) Network 130 for facial landmark estimation is composed of a hand-crafted ScatterNet front-end and a supervised learning-based back-end formed of the modified coarse-to-fine deep regression network (RN). The ScatterNet Hybrid Deep Learning (SHDL) Network 130 is constructed by replacing the first convolutional, relu, and pooling layers of the coarse-to-fine deep regression network with the hand-crafted parametric log ScatterNet. This accelerates the learning of the regression network (RN) as the Scatter-Net front-end extracts invariant (translation, rotation, and scale) edge features which can be directly used to learn more complex patterns from the start of learning. The invariant edge features can be beneficial for this application as the humans can appear with these variations in the facial images. Since the first layer (Scatter-Net) of the network is fixed or has no learnable parameters, fewer network parameters are required to be learned further requiring the need for fewer labelled examples. This makes the ScatterNet Hybrid Deep Learning (SHDL) Network 130 superior (in terms of speed of learning and annotated dataset requirement) to other deep convolutional networks.

Further, the new faces' facial landmarks are detected by the ScatterNet Hybrid Deep Learning (SHDL) Network 130 with only a single image. The landmarks are connected to form the unique signatures and can recognize the faces immediately after that.

The ScatterNet Hybrid Deep Learning (SHDL) Network 130 is used for the Facial Landmarks or facial keypoints detection in the Disguised Face Identification (DFI) framework 120. The Facial Landmarks or facial keypoints detection problem is formulated as a regression problem that can be modelled by the ScatterNet Hybrid Deep Learning (SHDL) Network 130. The ScatterNet Hybrid Deep Learning (SHDL) Network 130 takes an image of the face from either the simple or complex dataset or both and outputs the pixel coordinates of each facial landmark or facial keypoint for the face. An L2 norm is computed between the predicted points and the annotated landmark points of the same face image. The training objective is to estimate the network weights with the available training set D=(x;y) such that and the difference between the predicted and annotated landmarks is minimised. The loss function is shown below:

$$\operatorname*{argmin}_{\lambda} \sum_{(x,y) \in D} \sum_{i,j,k} \|G_{i,j,k}(y_k) - \phi_{i,j,k}(x, \lambda)\|^2 \quad (1)$$

$$G_{i,j,k}(y_k) = \frac{1}{2\pi\sigma^2} e^{-[(y_k^1-i)^2+(y_k^2-j)^2]/2\sigma^2} \quad (2)$$

is a Gaussian centered at joint $y_k$.

Figure 5:
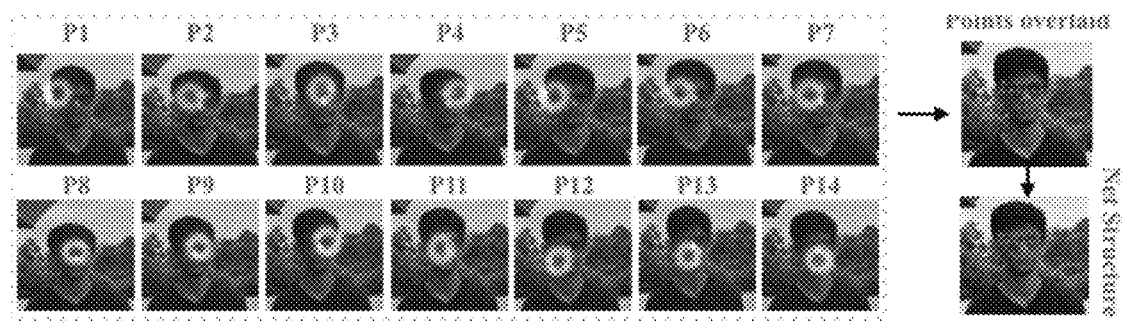
FIG. 5 illustrates facial keypoints into a star-net structure in accordance with the present invention.

The keypoints detected by the ScatterNet Hybrid Deep Learning (SHDL) Network 130 are connected to form a unique face-specific signature (star structure) which is further used for face identification. This unique face-specific signature (star structure) is shown in FIG. 5.

The detected facial landmarks or facial keypoints are next used by the Disguised Face Classification framework 230 to perform classification.

Figure 6:
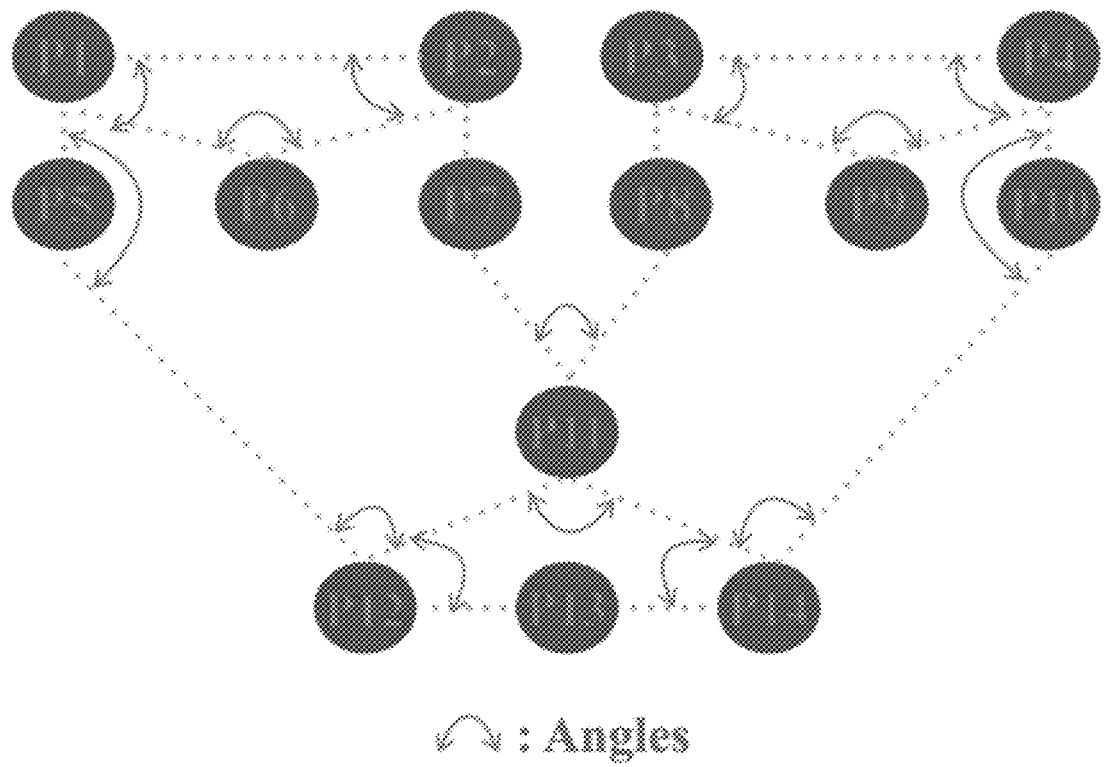
FIG. 6 illustrates various angles for keypoints into a star-net structure in accordance with the present invention.

In another embodiment, the present invention uses Disguised Face Classification framework 230 for comparing a disguised input face to the known non-disguised face database. The disguised input face image is considered a match to a specific image in the database if computed by estimating the L1 norm between the orientations between different key points in the star structure are below a specific threshold. In the star structure, the point at the Nose is the reference point for the various angles that are to be measured as shown in FIG. 6.

The similarity is calculated according to the equation below:

$$\tau = \sum_i |\theta_i - \phi_i| \quad (3)$$

where τ is the similarity, $\theta_i$ represents the orientation of the $i^{th}$ key point of the disguised image, and $\phi_i$ stands for the corresponding angles for each non-disguised image in the known non-disguised face database.

Figure 7:
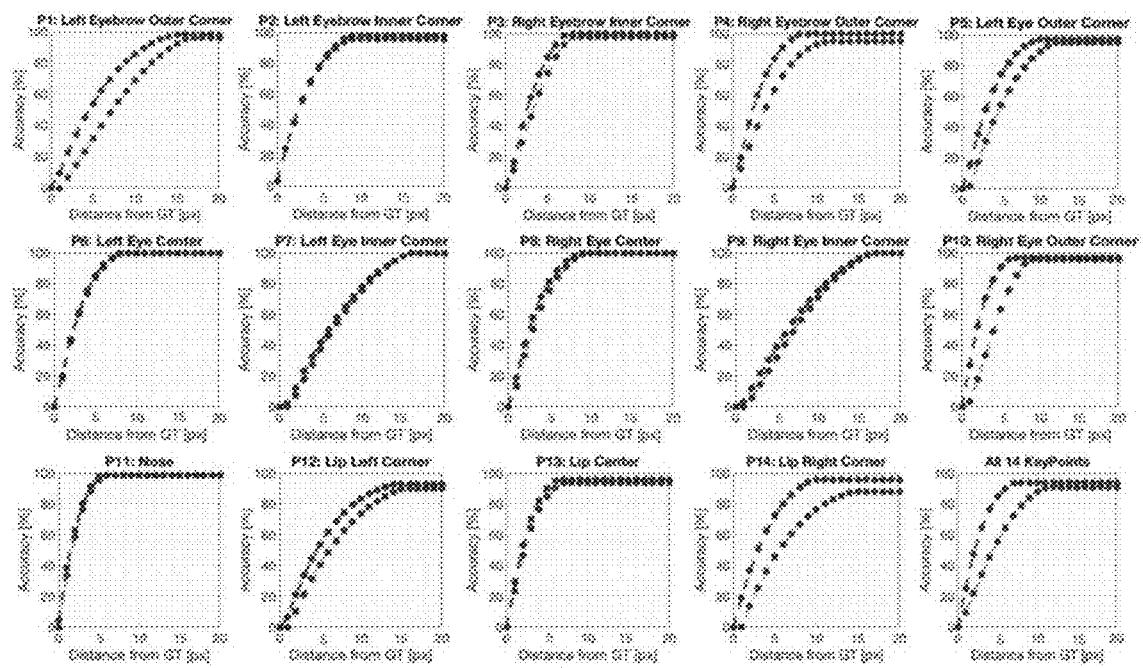
FIG. 7 illustrates a graphical representation of the performance of Disguised Face Identification (DFI) system in accordance with the present invention.

In one exemplary embodiment, it provides for the performance of facial key-points detection using ScatterNet Hybrid Deep Learning (SHDL) Network 106 of the disguised face identification (DFI) framework 120 on both the datasets 220. The performance of the ScatterNet Hybrid Deep Learning (SHDL) Network 130 is evaluated by comparing the coordinates of the detected key-points for an image in the simple or complex datasets with their ground truth annotations marked by the user. The performance of the key-point detection ScatterNet Hybrid Deep Learning (SHDL) Network 130 is shown in the form of graphs that plot accuracy vs. distance from the ground truth pixels. A keypoint is deemed correctly located if it is within a set distance of d pixels from the annotated ground truth. The key-point detection performance for both the simple (red) and complex (green) background face disguise dataset is plotted for each key-point as shown in FIG. 7.

Result 1:

In another exemplary embodiment, Table 1 provides the quantitative comparison of the predicted key-points for both the datasets at 3 (d=5, 10, 15) pixel distances from the ground-truth. As observed for d=5, an average keypoint detection accuracy of 85% was recorded for the simple background dataset as opposed to an accuracy of 74% for the complex background dataset.

TABLE 1

Table shows the keypoint detection accuracy (in %) on the simple background and complex background, face disguise (FG) dataset. The accuracy is tabulated with respect to the distance d (5, 10 and 15) in pixels from the ground truth (GT). There are 14 rows corresponding to 14 facial keypoints (can be more keypoints as well) and the last row corresponds to the average of all the facial key points plots.

| | Distance (Pixels) from Ground Truth (GT) | | | | | |
|---|---|---|---|---|---|---|
| | Simple (FG) Dataset | | | Complex (FG) Dataset | | |
| Points | D = 5 | D = 10 | D = 15 | D = 5 | D = 10 | D = 15 |
| P1 | 54 | 86 | 97 | 32 | 68 | 90 |
| P2 | 85 | 95 | 98 | 84 | 94 | 97 |
| P3 | 85 | 100 | 100 | 74 | 97 | 97 |
| P4 | 83 | 99 | 100 | 64 | 93 | 94 |
| P5 | 82 | 96 | 96 | 64 | 90 | 94 |
| P6 | 87 | 98 | 99 | 85 | 98 | 99 |
| P7 | 40 | 78 | 97 | 36 | 75 | 96 |
| P8 | 82 | 99 | 99 | 74 | 99 | 99 |
| P9 | 39 | 75 | 95 | 32 | 70 | 95 |
| P10 | 93 | 97 | 97 | 64 | 96 | 96 |
| P11 | 97 | 99 | 99 | 96 | 99 | 99 |
| P12 | 54 | 84 | 94 | 41 | 74 | 90 |
| P13 | 91 | 96 | 96 | 85 | 93 | 93 |
| P14 | 73 | 95 | 95 | 46 | 76 | 89 |
| All | 85 | 94 | 94 | 56 | 89 | 92 |

The accuracy increases for both datasets with an increase in pixel distance from the annotated ground-truth for both datasets.

Result 2:

In another exemplary embodiment, the present invention provides a comparison of keypoint detection performance by the ScatterNet Hybrid Deep Learning (SHDL) Network 130 with other various available prior art systems and methods namely CoordinateNet (CN), CoordinateNet extended (CNE) and SpatialNet. The keypoint detection accuracies are presented for the simple background face disguise dataset and complex face disguise dataset at d=5 pixel distance. The keypoint detection accuracy results for simple background are 77.6%, 78.2%, 81%, and 85% for CN, CNE, SpatialNet and ScatterNet Hybrid Deep Learning Network used by the proposed disguised face identification (DFI) framework 104 respectively. The ScatterNet Hybrid Deep Learning Network outperforms the other networks by a significant margin. The classification results for complex background face disguise dataset are 44%, 44.7%, 52.67% and 56% for SpatialNet and ScatterNet Hybrid Deep Learning (SHDL) Network, respectively.

TABLE 2 is a comparison of classification accuracies (%) of various architectures namely Coordinate Net (CN), Coordinate extended (CNE), Spatial net and Spatial Fusion (DFI) on the simple and complex face disguise datasets.

| | | Other Architectures | | |
|---|---|---|---|---|
| Dataset | DFI | CN | CNE | Spatial Net |
| Simple | 85 | 77.6 | 78 | 81 |
| Complex | 56 | 44 | 44.7 | 52.67 |

Result 3:

In another exemplary embodiment, the present invention provides the disguise face classification performance for each disguise for both the simple and complex datasets in table 3. It is observed from Table. 3 that the facial disguise classification performance decreases with an increase in the complexity of the disguise.

TABLE 3

Table presents the face disguise classification accuracy (%) for selected disguises on both datasets.

| | Disguises | | | |
|---|---|---|---|---|
| Dataset | Cap | Scarf | Cap + Scarf | Cap + Glasses + Scarf |
| Simple | 90 | 77 | 69 | 55 |
| Complex | 83 | 67 | 56 | 43 |

Result 4:

Finally, the Table. 4 shows that the disguise face classification framework 230 able to outperform the state-of-the-art on the simple face disguise datasets and complex Face disguise datasets by 13% and 9% respectively.

TABLE 4

Table shows the face disguise classification accuracy (%) compared against the state-of-the-art

| | Comparison | |
|---|---|---|
| Dataset | DFI | State-of-the-art |
| Simple FG Dataset | 74.4 | 65.2 |
| Complex FG Dataset | 62.6 | 53.4 |

The present invention can be used to identify wanted individuals intentionally attempting to hide their identity using different disguises in uncontrolled scenarios such as airports, shopping malls, government facilities etc.

One advantage of this invention is the use of the proposed ScatterNet Hybrid Deep (SHDL) Learning Network 130 that allows the Disguised Face Identification (DFI) framework 120 to learn key-point estimation rapidly as well as with relatively fewer annotated examples of faces. This is extremely advantageous as compared to other deep networks due to their reliance on large annotated datasets.

Another advantage of the present invention provides a large number of images and the Face Disguise (FG) Datasets 220 which can be effectively used to train the ScatterNet Hybrid Deep Learning (SHDL) Network 130 for facial key-point detection as standard datasets would not be suitable for this task.

Another advantage is that the deployed system can also be evolved by the user as he/she can add new faces, by simply clicking the face on the monitor screen (interactive) 210, to the database which are detected thereafter by the system as it learns to recognize the new faces using only their single added image using one-shot learning.

The embodiments according to the present invention may be implemented in the form of program instructions that can be executed by computers and may be recorded on computer readable media. The computer readable media may include program instructions, a data file, a data structure, or a combination thereof.

The implementations of the described technology, in which the system is connected with a network server and a computer system capable of executing a computer program to execute the functions. Further, data and program files may be input to the system, which reads the files and executes the programs therein. Some of the elements of a general purpose computer system are a processor having an input/output (I/O) section, a Central Processing Unit (CPU), and a memory.

The described technology is optionally implemented in software devices loaded in memory, stored in a database, and/or communicated via a wired or wireless network link, thereby transforming the computer system into a special purpose machine for implementing the described operations.

The embodiments of the invention described herein are implemented as logical steps in one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

The invention claimed is:

1. A Disguised Face Identification (DFI) system for identifying individuals with disguised faces, the system comprising:
   a Disguised Face Identification (DFI) Framework receives one or more input mage;
   a ScatterNet Hybrid Deep Learning (SHDL) Network performs estimation of facial keypoints from the input image using the deep convolutional networks;
   a Disguised Face Classification framework;
   one or more facial disguise (FG) datasets; and
   a known non-disguised faces database,
   wherein, the ScatterNet Hybrid Deep Learning (SHDL) Network detects facial keypoints from the input image, then these facial key points are arranged into star structure to form a unique face-specific signature, and the unique face-specific signature is compared by the Disguised Face Classification framework to perform matching the input image into the known non-disguised faces database that identifies the individuals with the disguised faces.

2. The Disguised Face Identification (DFI) system of claim 1, wherein the system is for identifying the individuals with the disguised faces in uncontrolled environments/scenarios.

3. The Disguised Face Identification (DFI) system of claim 1, wherein the system further identifies multiple individuals with different disguise in uncontrolled scenarios.

4. The Disguised Face Identification (DFI) system of claim 1, wherein the system further recognize the disguised faces at different orientations and distances.

5. The Disguised Face Identification (DFI) system of claim 1, wherein the system identifies the individuals with the disguised faces including a wide variety of altered physical attributes on the face or wearing numerous disguises such as but not limited to wearing a wig, changing hairstyle or hair color, wearing eyeglasses, removing or growing beards, wearing scarves, wearing caps, wearing mask etc.

6. The Disguised Face Identification (DFI) system of claim 1, wherein the Disguised Face Identification (DFI) Framework includes the facial disguise (FG) datasets.

7. The Disguised Face Identification (DFI) system of claim 1, wherein the facial disguise (FG) datasets include simple facial disguise (FG) datasets and complex facial disguise (FG) datasets for training the deep convolutional networks.

8. The Disguised Face Identification (DFI) system of claim 1, wherein the disguised face identification (DFI) framework further performs evaluation of the facial keypoints on the facial disguise (FG) datasets.

9. The Disguised Face Identification (DFI) system of claim 1, wherein the system further includes an interactive monitor screen.

10. The Disguised Face Identification (DFI) system of claim 9, wherein the system is further evolved by a user, allowing the user to add faces to the database by simply clicking images of a face on the monitor screen when needed and the individual is identified immediately.

11. The Disguised Face Identification (DFI) system of claim 1, wherein the system further comprising a training module that trains the ScatterNet Hybrid Deep Learning (SHDL) Network.

12. The Disguised Face identification (DR) system of claim 1, wherein the system is trained on a large dataset that contains faces with varied disguises, covering different backgrounds and under varied illuminations.

13. A method of identifying individuals with disguised faces, the method comprising:
   receiving one or more image of at least one disguised face into Disguised Face Identification (DFI) Framework; and
   estimating of facial keypoints from the image of the disguised face by a ScatterNet Hybrid Deep Learning (SHDL) Network;
   wherein the ScatterNet Hybrid Deep Learning (SHDL) Network detects the facial keypoints from the disguised face, then these facial key points are arranged into star structure to form a unique face-specific signature, and the unique face-specific signature is compared by a Disguised Face Classification framework to perform matching the input image into a known non-disguised faces database that identifies the individuals with the disguised faces.

14. The method of claim 13, wherein identifying the individuals with the disguised faces in uncontrolled environments/scenarios.

15. The method of claim 13, wherein identifies multiple individuals with different disguise in uncontrolled scenarios.

16. The method of claim 13, wherein identifying the individuals with the disguised faces including a wide variety of altered physical attributes on the face or wearing numerous disguises such as but not limited to wearing a wig, changing hairstyle or hair color, wearing eyeglasses, removing or growing beards, wearing scarves, wearing caps, wearing mask etc.

17. The method of claim 13, wherein the Disguised Face Identification (DFI) Framework includes the facial disguise (FG) datasets, the facial disguise (FG) datasets further include simple facial disguise (FG) datasets and complex facial disguise (FG) datasets for training the deep convolutional networks.

18. The method of claim 13, wherein further performs evaluation of the facial keypoints on the facial disguise (FG) datasets.

19. The method of claim 13, wherein the method is further evolved by a user, allowing the user to add faces to the database by simply clicking images of a face on a monitor screen when needed and the individual is identified immediately.

20. The method of claim 13, wherein the method further includes training on a large dataset that contains faces with varied disguises, covering different backgrounds and under varied illuminations.

* * * * *